C. L. CLARK.
CONVERTIBLE SHIELD FOR TROOPS.
APPLICATION FILED JULY 29, 1914.
1,304,541.
Patented May 27, 1919.
4 SHEETS—SHEET 1.
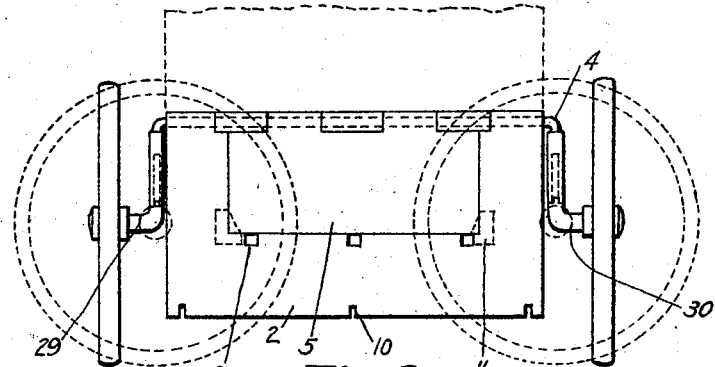
Fig. 2.
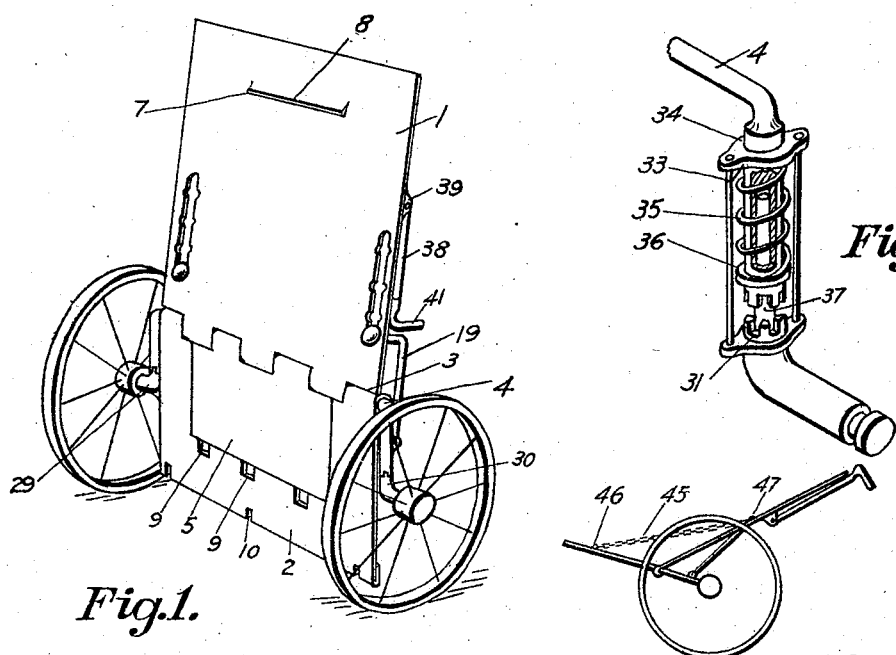
Fig. 1.
Fig. 7.
Fig. 8.
Cuyler L. Clark, Inventor
Witnesses
Frederick W. Jones
Corrine Ellis
By Edwin P. Gerber
Attorney

C. L. CLARK.
CONVERTIBLE SHIELD FOR TROOPS.
APPLICATION FILED JULY 29, 1914.

1,304,541.

Patented May 27, 1919.
4 SHEETS—SHEET 2.

Cuyler L. Clark, Inventor

Witnesses
Frederick N. Foss
Corrine Ellis

By Edwin P. Corbett
Attorney

C. L. CLARK.
CONVERTIBLE SHIELD FOR TROOPS.
APPLICATION FILED JULY 29, 1914.

1,304,541.

Patented May 27, 1919.
4 SHEETS—SHEET 3.

Witnesses
Frederick W. Ives.
Corrine Ellis.

Inventor
Cuyler L. Clark,

By Edwin P. Corbett
Attorney

C. L. CLARK.
CONVERTIBLE SHIELD FOR TROOPS.
APPLICATION FILED JULY 29, 1914.

1,304,541.

Patented May 27, 1919.
4 SHEETS—SHEET 4.

Witnesses
Frederick W. Joes.
Corrine Ellis.

Cuyler L. Clark, Inventor

By [signature]
Attorney

UNITED STATES PATENT OFFICE.

CUYLER L. CLARK, OF ZANESVILLE, OHIO.

CONVERTIBLE SHIELD FOR TROOPS.

1,304,541.   Specification of Letters Patent.   Patented May 27, 1919.

Application filed July 29, 1914. Serial No. 853,802.

*To all whom it may concern:*

Be it known that I, CUYLER L. CLARK, a citizen of the United States of America, residing at Zanesville, in the county of Muskingum, and State of Ohio, have invented certain new and useful Improvements in Convertible Shields for Troops, of which the following is a specification.

My invention relates to an apparatus for use in connection with an army and is in the nature of an improvement in convertible shields for troops which shields may be utilized individually or collectively to facilitate the operation of troops in the field, whether in battle or under various conditions to which they are normally subjected. The device is primarily advantageous when used as a shield, or it may be readily converted to form a push-cart, a boat framework or a tent frame-work. There are other possible uses to which my improvement may be put.

As a shield, the device is particularly efficacious because of the fact that it is controlable by hand and is sufficiently light to be readily removable by one man. It is equally advantageous because of the protection in front and the "overhead cover" afforded the soldier in his operation. By a comparatively simple adjustment the shield may be converted into a push-cart which will be of great advantage in the means it provides for carrying ammunition to the firing line from the rear and at the same time affording some degree of protection to the soldier. Furthermore, the strain of a long march may be greatly relieved by providing the individual soldier with one of these push-carts to carry the material of his pack which normally weighs in the neighborhood of forty pounds and has hitherto been carried upon his back. Likewise, the push-cart structure may be effectively used in transferring the wounded from the firing line to the rear or ammunition and supplies to the firing line.

In utilizing the shield structure to form a boat frame-work, a plurality of the shield-units are desirably connected in the manner to be described and this is similarly true in the construction of the supporting framework of a tent, a single piece of canvas sufficing to cover the boat frame-work or the tent frame-work.

It is a note-worthy fact that my improved device is comparatively light and capable of folding compactly for ready shipment.

The various possibilities of my improvement will appear as this description progresses, reference being had to the accompanying drawings, wherein similar characters of reference indicate corresponding parts and wherein:

Figure 1 is a perspective view of the shield in up-right position.

Fig. 2 is a front elevation of the lower portion of the shield, showing by dotted lines the manner in which the wheels may be adjusted to permit a lateral movement of the shield.

Fig. 7 is a detail showing the preferred form of adjustable axle.

Fig. 8 is a side elevation of the device converted into a pushcart.

Figure 3:
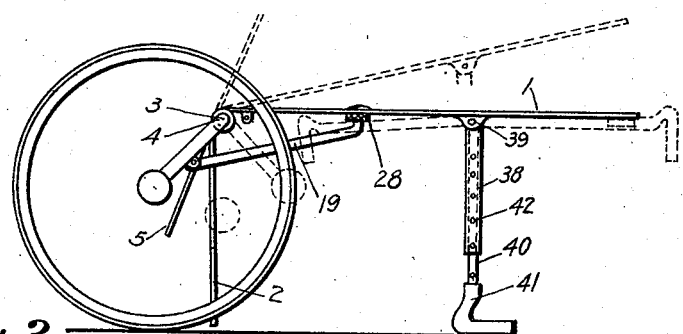
Fig. 3 is a side elevation of the shield in lowered position so that protection is afforded the soldiers when firing upon the enemy, the dotted lines in this figure showing some of the positions of adjustment.
Figure 4:
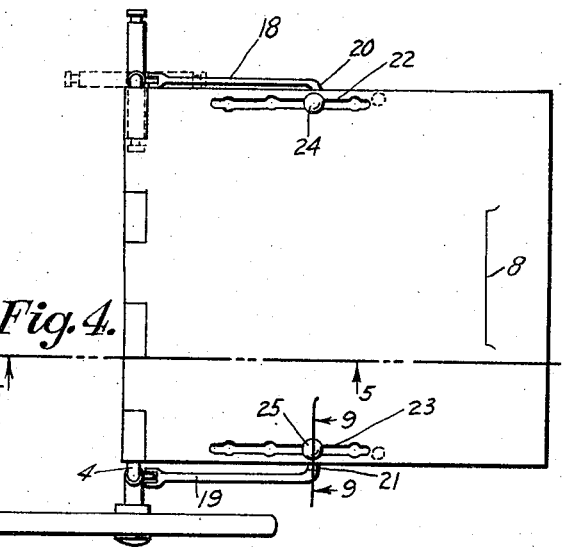
Fig. 4 is a plan view of a portion of the shield showing the adjustable brace structure for the wheel axle.
Figure 10:
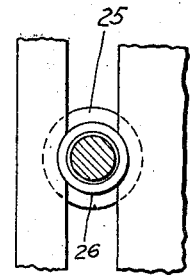
Fig. 10 is a section taken on line 10—10 of Fig. 9.
Figure 9:
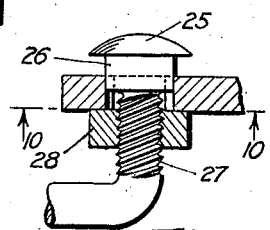
Fig. 9 is a section taken on line 9—9 of Fig. 4.

In the drawings, the shield is shown as comprising an upper plate 1, a lower plate 2, hinged as at 3 to the upper plate by means of an axle member 4. The lower plate 2 is cut away for the reception of a gate 5 which is likewise swung from the axle member 4. The lower plate 2 is free to maintain vertical position by gravity and the plate 5 also has a gravity action limited by a telescoping brace 6, shown best in Fig. 5.

The upper plate 1 is slotted as at 7 and the upper edge of the slot is pressed outwardly at an angle to form a lip 8, this structure producing an observation opening which is such as to protect the observer from bullets having a normal fall in approaching the shield. It may be well to explain that bullets fired by the enemy under normal conditions have a slight downward trend in their approach to the shield and, thereof, the angle of the lip 8 is definitely calculated so that the normal bullet passing below this lip strikes below the lower edge of the slot. I do not wish to be limited in the application of this protruding lip to a shield.

Figure 14:
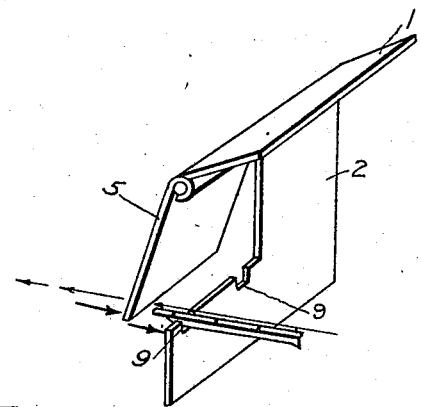
Fig. 14 is a sectional perspective illustrating the operation of the guarded loopholes, the heavy black arrows indicating the normal line of approach of the bullets and the light black arrows indicating the line of sight.

In the firing position, the gate 5 is normally braced partially open by the telescoping brace 6. The result is illustrated in Fig. 14. By inspection of this figure, it will be apparent that there is a line of sight, indicated by the light black arrows, whereby the enemy can be seen and yet the bullets which approach the shield with a normal fall will strike either the gate or the lower plate. The notched rifle rests 9 cause the body of the rifles to lie below the plane of the slit so that the line of sight passes through such slit. Thus the man or men firing are protected completely.

Reference to Fig. 14 will show that the gate 5 is in advance of the plate 2 and the bullet is higher in its course of flight than when it reaches the plate 2. Therefore if it passes beneath the gate 5, it is too low when it reaches the plate 2 to pass through the opening.

The lower plate 2 is further provided with notches 10 in its lower edge for a purpose to be hereinafter described. In addition, this plate has its loophole provided with corner pieces 11 that prevent the gate 5 from swinging entirely through the opening rearwardly.

The brace 6 comprises an outer member 12 and an inner member, the extent of the telescoping action of these two members being limited by a pin 14 which may be placed in any one of the holes 15. Thus, the gate 5 may swing outward freely but is limited in its downwardly inward movement by the pin 14. The member 13 may be released from the gate to which it is detachably hooked at 16 and upon such release may be connected to the lug 17.

The axle structure of my improved shield is bodily adjustable about a normally horizontal axis, as shown fully in dotted lines in Fig. 3 of the drawings. These adjustments are under the control of brace members 18 and 19 which are pivotally secured to such axles and which terminate in L-shaped portions 20 and 21 extending through slots 22 and 23 in the face of the upper portion 1 of the shield. These slots are provided at determinate intervals with circular enlargements and the L-shaped portions on the members 18 and 19 carry heads 24 and 25 and shoulders 26, these shoulders being of a size to fit the enlarged circular openings. Immediately below the shoulders 26 are threaded portions 27 carrying adjustable clamping nuts 28. In operation of this device, the nuts 28 are loosened so that the shoulders 26 can be released from the circular openings in the slots 23 to permit of the adjustment of the L-shaped extensions 20 and 21 along the slots. When the proper position of adjustment is reached, the nuts 28 may then be tightened and the axle is held in the adjusted position with ample permanence. By examination of Fig. 3, the different adjustments possible may be determined, although it will be apparent that the degrees of adjustments may be determined by slight changes of construction. This description refers to the bodily adjustments of the axle about a normally horizontal axis but I find it desirable to have each wheel independently adjustable to varying angles about the drop portions of the axle and I preferably attain this result by the structure shown in Fig. 7, wherein those portions of the axle which actually support the wheels are capable of rotary adjustment about a normally vertical axis.

These wheel supporting portions may be designated 29 and 30 and are connected to the extremities of the axle body by a clutch 31 whose sections are held in coöperative relation by a yoke 33 sliding upon the extremities of the axle as at 34 and normally pulling the clutch faces together by a compression spring 35 bearing upon the permanent ring 36 carried by the axle extremity. By inspection of Fig. 7 it will be understood that the yoke 33 carries the wheel-supporting section and is normally held in uplifted position by the compression spring 35. The member which carries the collar 36 is provided with a socket for the reception of the reduced extension 37 of the wheel-supporting member. This telescoping connection holds the axle in the proper position of alinement. The principal purpose of these adjustments of the wheel-supporting members are illustrated by the dotted-line position of the wheel in Fig. 2, and of the wheel-supporting members in Fig. 6 and Fig. 11, although it will be apparent that practically any position of these members may be obtained by slight structural variation.

Carried upon the rear surface of the upper plate 1 of the shield are extensible handles and supports which are relatively independent, and each of which comprises a main socket member 38 pivotally supported at 39 and adapted for the reception of the reduced portion 40 of the handle 41, the reduced portion being adapted to telescope in the member 38 and be adjusted at various positions therein by means of registering apertures 42 for the reception of a securing spring lug attached to the inner rod. The reduced portion 40 and the socket within which it operates are cylindrical so that the handle 41 may be rotatably adjusted, the registering apertures being of such nature that this adjustment can be maintained.

Figure 5:
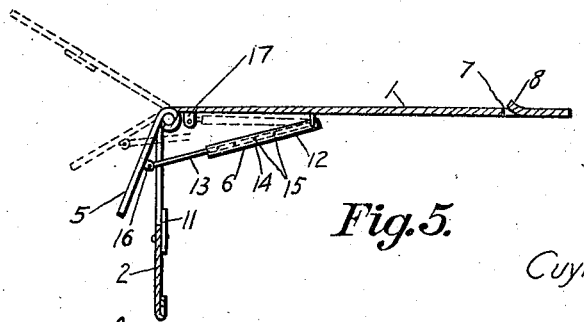
Fig. 5 is a section taken on line 5—5 of Fig. 4.

In operation of this shield, the device may be moved toward the enemy with one or two men behind it and during such movement it is practically in the position shown in Fig. 1. If in the course of this advance, it is desired to move the shield laterally the wheels are adjusted to the dotted-line position in Fig. 2 and such lateral movement of the shield may be effected without exposing the operator to the enemy. When the proper location for firing is attained, the upper plate 1 is dropped rearwardly and is held in definite relation to the ground by the extensible handles or supports which are desirably lengthened so that this upper plate 1 will assume the dotted-line position in Fig. 3. The lower plate 2 has already assumed the gravity position shown in Fig. 3 and the gate 5, see Fig. 5, is automatically braced partially open, the degree of this opening being dependent upon the adjustment of the brace 6. The operator or operators may then take a prone position beneath the plate 1 and rest their rifles or machine guns in the notches 9, being fully protected by the gate 5. It will be noted by Fig. 3 that the upward and rearward incline of the upper plate tends to protect the legs of the soldiers more fully from the falling bullets than if such plate were maintained in level position. This "overhead cover" is very essential and particularly effective to protect the operator against shrapnel bursting in the air or hand grenades which are frequently used by the enemy.

Figure 6:
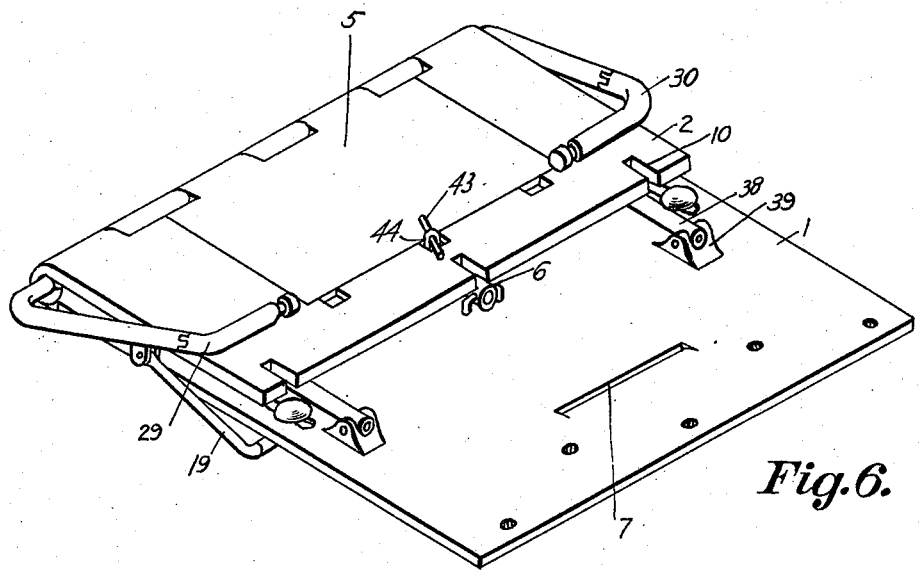
Fig. 6 is a perspective view of the shield in collapsed position.

In packing my shield for shipment or to facilitate transportation when not in use, it is preferably folded to the position shown in Fig. 6, the wheels being removed, the lower plate 2 and its gate 5 being folded onto the upper plate and held in such folded position by a taper pin 43 placed in opening 44. In this folded position, the wheel-supporting members are turned inwardly toward each other and the handles and the brace 6 are folded beneath the lower plate 2. It will be equally apparent, by reference to Fig. 3 that folded position may be attained without removing the wheels by shifting them to the dotted line position of this figure.

When used as a push-cart the axle structure is desirably adjusted to the position shown in Fig. 8 and the lower plate 2 is turned forwardly upward to the desired angle, when it is supported by chains 45 adjustable as to length secured at 46 and 47 and preferably detachable from these connections.

My shield is peculiarly advantageous because of the fact that it may be so transformed into a V-shaped vehicle and this may be either a widely spread V-shape or a narrow V-shape. Ammunition may thus be readily carried to the firing line under substantial protection while the vehicle occupies very little space.

In using the device for transferring wounded to the rear, the wounded man may be placed in a semi-reclining position and thus may be removed from the field by one man. The adjustment of the axle structure makes it possible to vary the support in accordance with the different types of loads. The position of the axle may be so adjusted that the center of gravity of any load will be accurately balanced over the wheels and the weight need not be supported by the operator.

Figure 11:
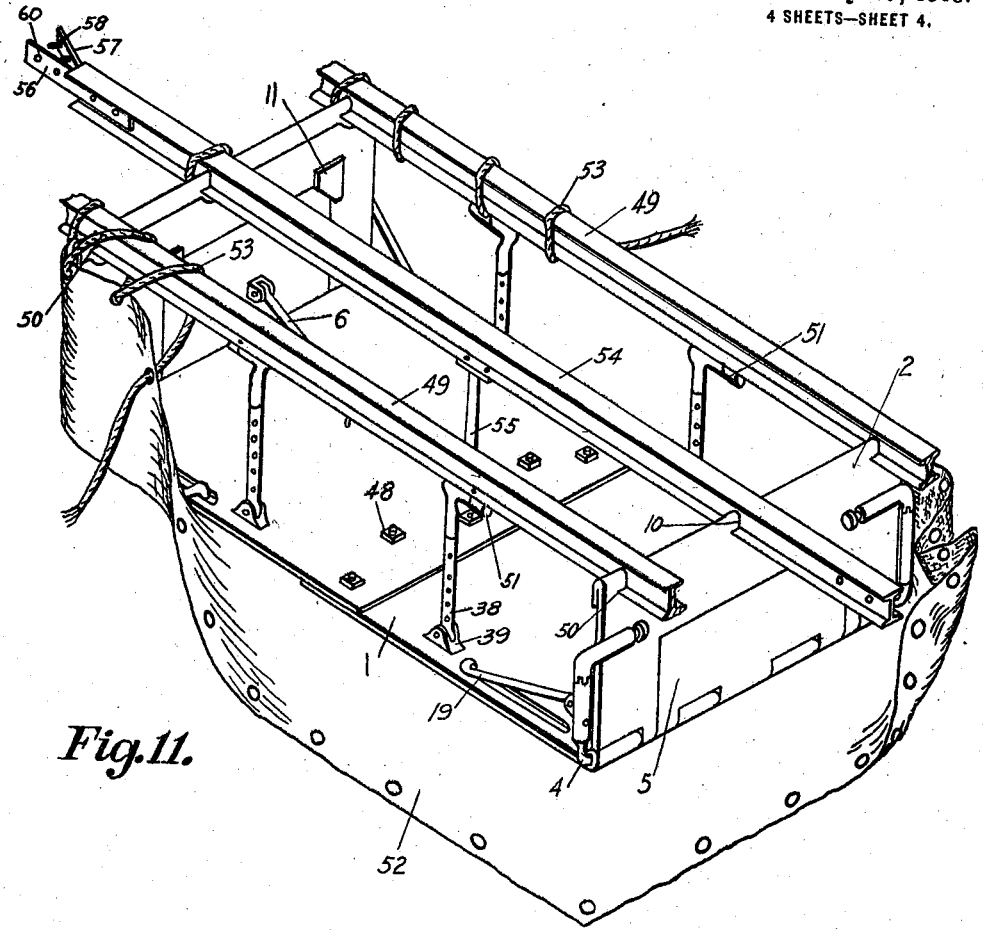
Fig. 11 is a perspective view of a section of the pontoon bridge framework to be formed with the aid of my improvement.

In production of a pontoon boat, the upper plates 1 of two shield units are bolted together as at 48 and the lower plates 2 are turned upwardly to the position shown in Fig. 11 where they are held by longitudinal brace elements 49 desirably of I-beam formation and having their bases cut away as at 50 and their webs at this point fitting in the notches designated 10 in Fig. 1. These I-beams 49 are braced at intervals by the shield handles which have been turned up to fit in the sockets 51. Then, the whole is surrounded by a canvas covering 52 provided with lacing 53 which is used to lash the covering to the I-beams 49. It will be noted that the adjustable axle shown in Fig. 7 permits the conversion of such axle into a brace, restraining outward movement of the ends of the boat through the aid of the element 19. Likewise, brace 6 also supports the ends of the boat.

In constructing a pontoon bridge, the boats are placed end to end and fastened together by the three I-beams 49 and 54, which are desirably supported at central points and which are provided with connecting devices at their ends. The connection may be in the form of a rigid fish plate 56 and a hinged fish plate 57 carrying coupling pins 58, there being provided means for locking this plate in position. This renders possible a quick coupling of the ends of the I-beams. Inter-locking relation of these I-beams with the edges of the shield plates hold the boats in their proper relative positions.

Figure 13:
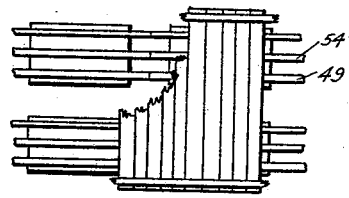
Fig. 13 is a diagram showing the shield unit combined with suitable flooring to form a pontoon bridge for infantry, cavalry, and light artillery and their accompanying trains.

When a line of boats are properly assembled by means of the connecting I-beams as above-described a unit of floor support is formed. One unit across the stream forms the support for a foot bridge and two units parallel at a small interval of space (see Fig. 13) forms a wagon bridge capable of supporting all military equipment of a field army, except heavy field artillery. Three units side-by-side with no space therebetween form a bridge capable of supporting a concentrated load of about 5000 pounds. Four units side-by-side at ordinary intervals form a double roadway.

In the absence of flooring and the longitudinal rails which form the floor supports, the boats may be used for ferrying troops across streams. The framework is so constructed that the four rifles of the men who accompany the shields which form one boat may be lashed to the side supports so as to form side-rails to which the canvas covers may be attached. One boat may be sculled across the stream and the ends of a rope secured on each bank. The remaining boats may be pulled across by the efforts of the occupants.

Figure 12:
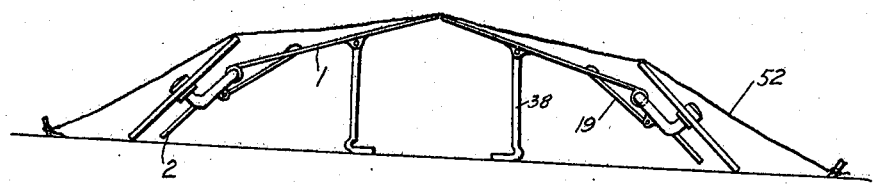
Fig. 12 is an end elevation of my improvement in application to a tent structure.

To form the framework for a tent, two shields are placed end to end and facing in opposite directions, as shown in Fig. 12. The canvas boat cover is then stretched from the framework to the ground in one or both directions and secured by pins.

Attention is called to the fact that the tent thus formed is of ample size for the four men ordinarily attached to the two shields, and of more substantial material than can be carried in a soldier's pack.

By way of review it will be apparent that I have provided a shield structure which is readily handled and capable of supporting material for transportation by converting it to a form of vehicle which requires a minimum amount of road space because of the adjusted position of the shield plates and axle. The device as a shield is probably best adapted for use by two soldiers and, while protecting them well under normal conditions of battle, is adapted to meet the various emergencies which may arise. It furnished complete front and overhead cover with thin plates of armor that are adjustable to the best positions for various kinds of fire. Furthermore, it furnishes cover and practically complete protection for a man in prone position, which is the natural position for accurate fire. Apparent advantages arise from the fact that the shield is comparatively inconspicuous and of suitable construction and weight to permit movement over any kind of terrain, being sufficiently light to be carried when necessary by its two operators. The shield is further adapted to the ready use in the destruction of barb-wire entanglements, since it can be moved either forwardly or laterally while furnishing complete front and overhead cover. The advancing of trenches toward the enemy will be facilitated by maintaining one of my shields at the head of the trench.

Probably one of the most important features of my improvement arises from the fact that it is convertible to so many practical uses and thus compensates for the additional weight which must be transported with the army for the reason that, instead of increasing the number of motor trucks or horses and wagons which must accompany a wagon, the employment of my shields materially reduces the necessary number of such vehicles, especially in the bridge and combat trains.

To be more specific, the shields when converted into vehicles are capable of supporting and carrying ammunition and accouterment of the soldier. Furthermore, they constitute the heavy structure of the pontoon bridge work and of the tents which has hitherto been carried by wagons provided therefor. In the present instance, it is apparent that the heavy pontoon and tent material will be carried by the individual troopers or pushed by the individual troopers.

Having thus described my invention, I claim.

1. A shield comprising wheels, an axle joining said wheels, and a flat sheet directly mounted on said axle between said wheels, said wheels being adjustable for steering.

2. A shield comprising wheels, an axle joining said wheels, a flat sheet mounted upon said axle, and adjusting means directly upon said axle to vary the position of said sheet.

3. A shield comprising a plate structure formed in two parts, a vertically adjustable axle structure, wheels on said axle structure, the lower part of said plate structure being swingable, to facilitate vertical adjustment of said axle.

4. A shield for use in warfare comprising wheels, an axle member, a tiltable plate pivoted at its lower end on said axle, and a gravity hanging plate pivoted at its upper end to said axle.

5. A shield supported upon wheels comprising a lower portion normally substantially vertical, an upper portion hinged at its lower end with said lower portion and constructed to be positioned at desired positions varying from the vertical to the horizontal, and means for locking said upper portion in desired positions.

6. A shield supported upon wheels comprising a lower portion normally substantially vertical, an upper portion hinged at its lower end with said lower portion and constructed to be positioned at desired positions varying from the vertical to the horizontal, means for locking together said upper and lower portions, and means for supporting said upper portion when positioned near the horizontal.

7. A shield comprising an overhead cover plate, and props adjustable as to length to support said plate in horizontal position and in positions varying from the horizontal.

8. A shield comprising a lower plate, an upper plate adapted to be swung relative to said lower plate, and handles adapted to support said upper plate when angularly positioned to said lower plate.

9. A shield comprising a lower plate, an upper plate adapted to be swung relative to said lower plate, and handles adjustable as to length and adapted to support said upper plate when in angular position with said lower plate.

10. A shield comprising a lower plate, an upper plate adapted to be swung relative to said lower plate, and handles adjustable as to length and rotatably adjustable and adapted to support said upper plate when angularly positioned to said lower plate.

11. A shield comprising two plates, an axle member forming a hinge bolt for said two plates to turn upon each other, and wheels carried by said axle.

12. A shield comprising two plates, an axle member forming a hinge bolt for said two plates, wheels carried by said axle, and means for adjusting the axes of said wheels laterally at varying angles with said axle.

13. A shield comprising two plates, an axle of U-form, wheels on the ends of said axle, and adjustable braces for the ends of said axle.

14. A shield comprising a laterally extended slot, a lip positioned to guard said slot against bullets moving in a normal parabolic path and yet to permit sight therethrough.

15. A shield comprising a plate having a laterally extended slot variable with conditions to present a lip to guard said slot against bullets moving in a normal parabolic path and yet to permit sight therethrough.

16. A shield comprising a plate having an opening, a guard plate for said opening, said guard plate being adjustable to exclude bullets moving in a normal parabolic path and yet to permit sight therethrough.

17. A shield comprising a plate having a loophole, a guarding plate for said loophole, and means to automatically position said guarding plate and still maintain a sight-hole upon variation of position of the shield.

18. A shield comprising wheels, an axle for said wheels, plates hinged upon said axle, means for relatively securing said plates in acute angular position to serve as a double thickness shield.

19. A shield comprising wheels, an axle for said wheels, plates hinged upon said axle, means for relatively securing said plates in an acute angular position, said axle constructed to permit regulation of the height of said plates.

20. A shield comprising wheels, an axle for said wheels, plates hinged upon said axle, means for securing said plates in acute angular position, said axle constructed to permit adjustment of said plates so that their center of gravity will be approximately in line with the centers of said wheels.

21. A shield forming a vehicle comprising wheels, and an axle for said wheels, said axle being off-set between said wheels.

22. A shield forming a vehicle comprising wheels, and a body upon said wheels and foldable in acute angular position.

23. A shield forming a vehicle comprising wheels, a body foldable in acute angular position and adjustable upon said wheels to permit balancing of the load.

24. A shield comprising a plate, axle structure and wheels extending laterally from the edges of said plate, said axle structure and plate being foldable into parallel relation within the area of said plate.

25. A shield comprising a plate, axle structure and wheels mounted thereon, said axle structure so constructed that its ends may be positioned at right angles to its longitudinal axis.

26. A shield comprising a plate, axle structure and wheels mounted thereon, said axle structure so constructed that its ends may be angularly positioned with its longitudinal axis.

27. A shield comprising a plate, axle structure and wheels mounted thereon, said axle structure so constructed that the wheels may be angularly positioned in relation to the longitudinal axis of said axle structure.

28. A shield comprising a plate, axle structure and wheels mounted thereon, said axle structure so constructed that the wheels may be positioned in a plane parallel to said plate.

29. A shield comprising a plate, axle structure and wheels mounted thereon, said axle structure so constructed that its ends may be angularly positioned with relation to its longitudinal axis, and means for locking said ends in angular positions.

30. A shield comprising a plate, axle structure and wheels mounted thereon, said axle structure so constructed that the wheels may be angularly positioned with relation to its longitudinal axis, and means for locking said wheels in angular positions.

In testimony whereof I hereby affix my signature in presence of two witnesses.

CUYLER L. CLARK.

Witnesses:
CORRINE ELLIS,
W. A. LEGG.

Copies of this patent may be obtained for five cents each, by addressing the "Commissioner of Patents, Washington, D. C."